United States Patent [19]
Bocci et al.

[11] Patent Number: 5,392,283
[45] Date of Patent: Feb. 21, 1995

[54] DATA COMMUNICATION PROTOCOL

[75] Inventors: Paul M. Bocci, Roselle; John M. Gilbert, Schaumburg; Larry E. Feldman, Buffalo Grove, all of Ill.

[73] Assignee: Motorola, Inc., Schaumburg, Ill.

[21] Appl. No.: 113,022

[22] Filed: Aug. 27, 1993

[51] Int. Cl.⁶ ............................ H04B 7/26; H04J 3/16
[52] U.S. Cl. ...................... 370/79; 370/94.2; 370/110.1; 379/63; 455/56.1; 455/68
[58] Field of Search ............. 370/60, 79, 81, 82, 370/83, 94.1, 94.2, 99, 110.1, 111, 112, 118; 379/88, 58, 63; 381/29, 31; 371/32, 33, 34; 455/38.1, 49.1, 53.1, 54.1, 56.1, 67.1, 68, 54.2

[56] References Cited

U.S. PATENT DOCUMENTS

| | | | |
|---|---|---|---|
| 4,736,369 | 4/1988 | Barzilai et al. | 370/79 |
| 4,755,992 | 7/1988 | Albal | 370/94.1 |
| 4,774,706 | 9/1988 | Adams | 370/94.1 |
| 4,809,268 | 2/1989 | Tejima et al. | 370/93 |
| 4,926,420 | 5/1990 | Shimizu | 370/82 |
| 4,951,278 | 8/1990 | Biber et al. | 370/94.1 |
| 5,012,470 | 4/1991 | Shobu et al. | 370/110.1 |
| 5,148,429 | 9/1992 | Kudo et al. | 370/94.2 |

*Primary Examiner*—Alpus Hsu
*Attorney, Agent, or Firm*—John W. Hayes

[57] ABSTRACT

A data communication protocol permits efficient and cost-effective transmission of control and ancillary messages among the components of a communication system infrastructure (200). Messages are organized into Infrastructure Control Words (300) with accompanying Format Identifiers (304), and interleaved with voice and data segments (707) to form message streams (700) that are transmitted from one infrastructure component, such as a base station (201), to another infrastructure component, such as a Digital Interface Unit (202).

5 Claims, 4 Drawing Sheets

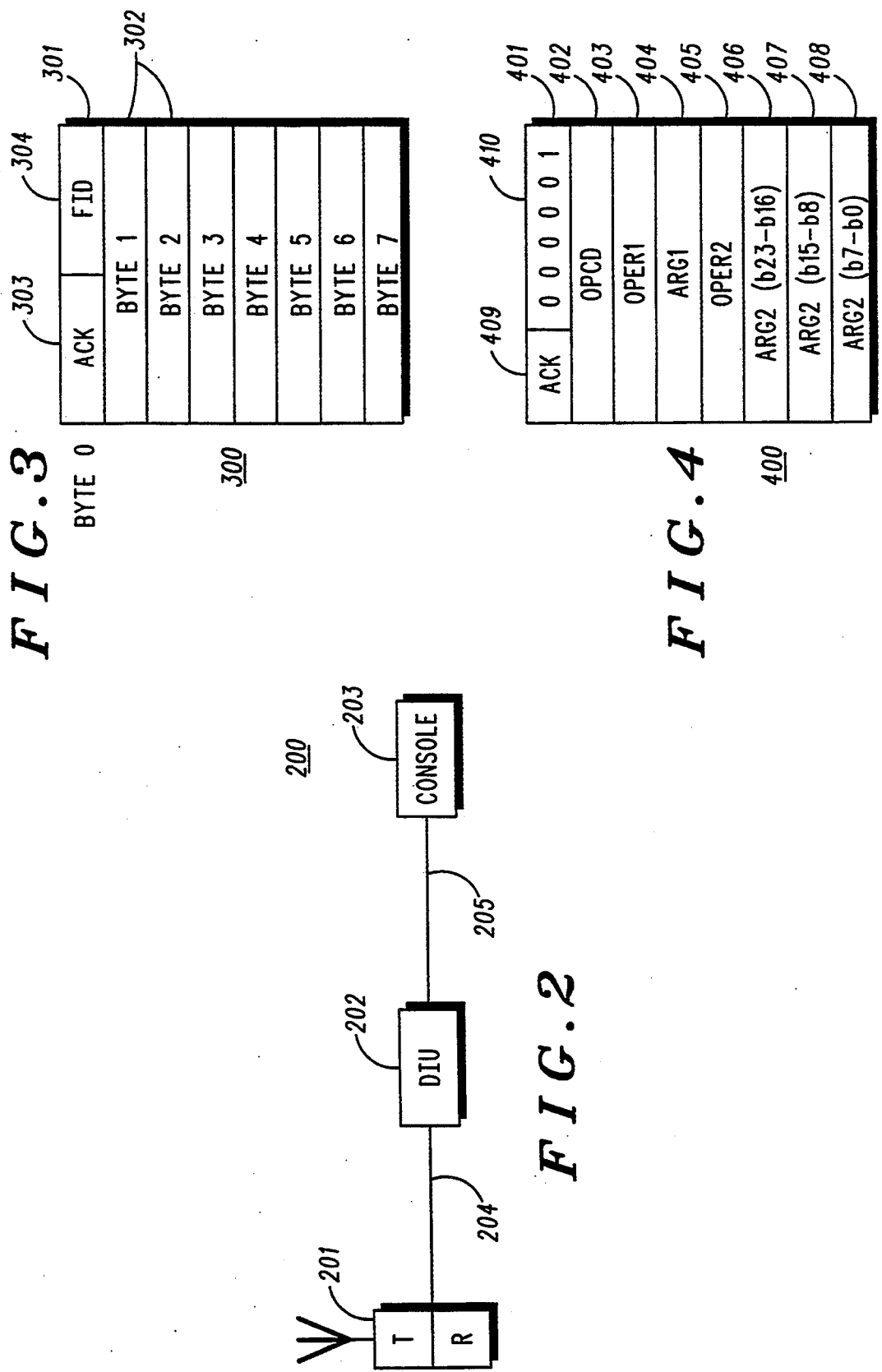

DATA COMMUNICATION PROTOCOL

FIELD OF THE INVENTION

This invention relates generally to communication systems and in particular to communication among component parts of a communication system, and is more particularly directed toward a data communication protocol.

BACKGROUND OF THE INVENTION

Providing the general public with the ability to communicate information to specific persons at particular times is the general goal of a communication system. RF (radio frequency) communication systems provide the aforementioned capabilities in perhaps the most convenient fashion, with communication units that can be installed in a vehicle (mobile communication units) and communication units that can be easily carried in the hand or attached to the person via holster or belt-clip (portable communication units). A communication system accomplishes its purpose, in a variety of ways, by making communication resources available for use by these communication units. Communication resources may be RF frequencies or channels, or pairs of RF frequencies in the case of full-duplex communication. These communication resources may also be time slots in the case of TDM (time division multiplex) systems. Whatever form the communication resources may take, the communication system must allow communication units used by system subscribers to use these resources efficiently.

FIG. 1 illustrates, in block diagram form, a conventional analog communication system of the prior art, generally depicted by the numeral 100. A control console (101), including one or more operator positions, is shown coupled to a base station (102) over a point-to-point communication interface (103). The point-to-point interface (103) may be telephone lines, dedicated hard-wired lines, a microwave link, etc. The console (101) may also be connected to other base stations, repeaters, and satellite receivers as well-known in the art. The communication system (100) as shown supports communication among a number of mobile communication units (104) and portable communication units (105).

From time to time, it becomes necessary for the console (101) to transmit control information to the base station (102) in addition to voice, selective signalling, and other types of normal traffic information intended to be transmitted over the air. Examples of this control information include: transmitter on, transmitter off, etc. In communication systems of the prior art, it was not uncommon to use tone remote control to convey this control information. In a tone remote system, predetermined audio tones would be switched onto the interface (103), corresponding to particular control commands from the console (101). Filters in the base station (102) were responsive to these audio tones, and would cause the desired function to be activated. In other systems, d.c. (direct current) remote control would be implemented. In a d.c. remote control system, current sources of predetermined values would be switched onto the interconnecting interface (103). Devices sensitive to different current levels, such as relays with different pull-in current specifications, would then activate the desired functions. Of course, in a d.c. remote control application, the interface (103) would have to be hard-wired.

As communication systems have increased in complexity, more and more special functions have to be accommodated by any system control protocol. Simulcast, majority voting of input signals, encryption, and site selection are just a few of the functions that require support in modern systems. In the latest digital communication systems, system components are capable of being switched from analog to digital modulation.

Control protocols of the prior art do not provide a large enough command set to encompass the variety of functions available on modern systems. Prior art control protocols are relatively slow to respond, and require additional electronic components in the form of filters or relays in order to operate. In addition, prior art activation signals, such as tones or current levels, do not integrate well with voice and data information being sent to base stations and repeaters for transmission. These activation signals must be sent before voice and data, thus causing additional system delay.

Accordingly, a need arises for a data communication protocol with an extensive command set that eliminates the need for additional electronic components in order to operate. In addition, the data communication protocol should have a fast response time, and should be easy to integrate with voice and data traffic signals.

SUMMARY OF THE INVENTION

These needs and others are satisfied by the data communication protocol of the present invention, in which a first operation instruction to be performed and corresponding data are provided. A first format is selected from among a plurality of formats, then the first operation instruction to be performed and the corresponding data are organized in accordance with the first format to provide a first data message. The first data message is combined with a format indicator, where the format indicator identifies the first format to form a first word, and the first word is transmitted.

Moreover, the data communication protocol in accordance with the present invention may be utilized in any radio communication system comprising a plurality of fixed devices. It will be appreciated by those skilled in the art that such fixed devices include, but are not limited to, base stations, consoles, and digital interface units.

BRIEF DESCRIPTION OF THE DRAWINGS

FIG. 2 is a block diagram of a communication system in which the protocol of the present invention may be implemented;

FIG. 3 is a block diagrammatic representation of an Infrastructure Control Word;

FIG. 4 is a more specific depiction of an Infrastructure Control Word in accordance with the present invention;

DESCRIPTION OF A PREFERRED EMBODIMENT

Figure 1:
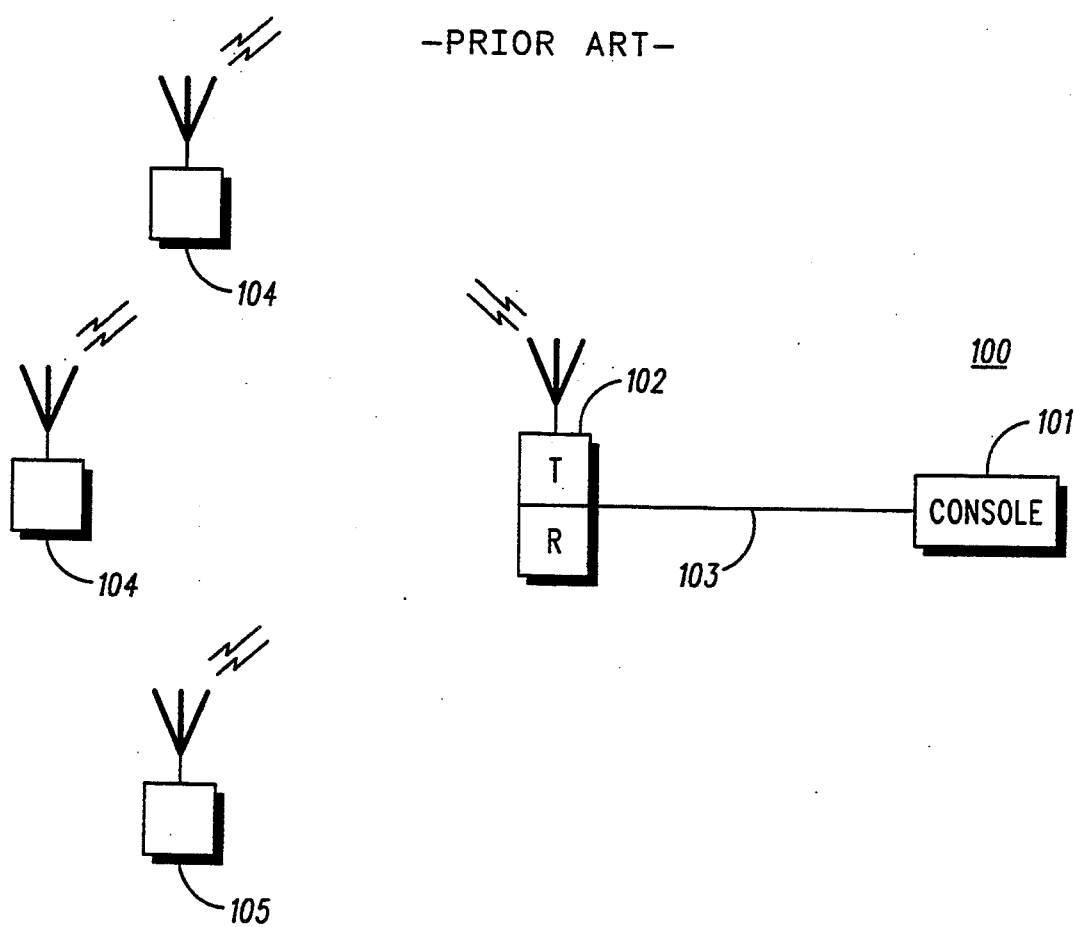
FIG. 1 illustrates, in block diagram form, a communication system of the prior art.

The following paragraphs describe in detail a method devised by the inventors for transmitting data, combined with a format indicator, among components of a communication system, in a fashion that avoids the shortcomings revealed in the foregoing discussion of the background art.

An RF communication system generally includes RF communication units communicating through the use of RF communication resources. These communication units may be fixed, mobile or portable. Fixed communication units may include base stations, repeaters, satellite receivers, associated voting comparators, etc., all interconnected with one or more communication consoles. The fixed portion of the RF communication system forms an infrastructure for the system, and fixed system components communicate with one another through the use of fixed communication links, which may be point-to-point microwave links, telephone lines, dedicated hardwired or fiber optic lines, etc. in short, it is necessary for communication consoles to communicate with other infrastructure components such as the aforementioned base stations, repeaters, satellite receivers, etc.

The information transferred through the various fixed communication links of a communication system infrastructure includes both the end-to-end payload or user information as well as local, ancillary or control information used to provide for activation and configuration of the various system elements. This control information can be variable in size and content depending on the specific functions needed. Further, this control information may be required at times when the system is actively processing real-time user information, such as voice, as well as at times when the system is either idle (not processing user information) or processing non-real-time information. The data protocol used for the control information must therefore accommodate the conflicting goals of variable information size and content, and fixed word size to facilitate interleaving. This invention accomplishes this by the use of a fixed-size information word, or Infrastructure Control Word (ICW), combined with a format indicator (FID) to specify how the remainder of the control information word is organized. This scheme permits the transfer of multiple short messages, as well as single long messages, in the same size data word.

FIG. 2 illustrates pertinent portions of a modern communication system, having digital and analog capability, as generally depicted by the numeral 200. The portions illustrated include the fixed elements of the RF communication system that make up the system infrastructure. Mobile and portable communication units for which the system provides communication capability are not shown, for the sake of clarity. The system may be characterized as having two directions of user information flow: inbound, from a mobile communication unit used by a system subscriber (not shown), that enters the infrastructure at a base station (201), and outbound, entering the infrastructure from a control console (203).

Normal system message traffic in the form of inbound user information is received at the base station (201), where it is demodulated. It is further converted into an alternate form and transmitted over a fixed communication link (204). This user information may be either voice or data. Prior to transmission over the fixed communications link (204), control information is added in the form of an Infrastructure Control Word and interleaved with the user information. This control information is provided to allow additional fixed communication elements, such as Digital Interface Units (DIUs) and consoles to process the user information in the appropriate manner. The DIU (202) forms the interface between control consoles and other infrastructure components. The format indicator is included in the Infrastructure Control Word to permit proper decoding of the control information. The user information received by the DIU (202) is processed in accordance with the instructions contained in the Infrastructure Control Word received from the base station (201), specifically to convert it into a form usable by the console (203). The processed user information is then transmitted over another fixed communications link (205) to the console (203) where it is made available to a console operator.

Outbound information is entered at the console (203) and transmitted over the fixed communication link (205) to the DIU (202). The outbound user information is processed in the DIU (202) in accordance with instructions contained in control information received from the console (203). The processed user information is transmitted over the fixed communication link (204) to the base station (201). Prior to transmission over the fixed communication link (204), control information is added in the form of an Infrastructure Control Word and interleaved with the user information. A format indicator is included in the Infrastructure Control Word to permit proper decoding of the control information. The user information is then processed by the base station (201) in accordance with the control information. Typically, the user information is transmitted over the RF channel.

FIG. 3 is a representation of an Infrastructure Control Word as generally depicted by the numeral 300. The Infrastructure Control Word (300) includes 8 information bytes, where a byte is eight bits long. These 8-bit bytes are sometimes referred to as octets. The first information byte (301) is further divided into two information fields (303 and 304). The first information field (303) is used to request and provide acknowledgments or ACKs to commands. The second information field (304) is the Format Indicator or FID which defines the use of the remaining information bytes (302) of the Infrastructure Control Word (300). Three types of information may be included in these remaining bytes (302): Opcodes, Operands and Arguments. These three types of information are hierarchical in nature, with the opcode indicating a high level function such as reception of a message or selection of a control function; the operand providing a modifier for the opcode, such as modulation type; and the argument providing a specific value for the operand such as analog modulation or specific channel number.

The ACK field (303) is a three-bit field, so it can accommodate up to eight different acknowledgement-related messages. The ACK field may contain an acknowledgement request, so that the infrastructure component that originates the ICW will know that it was properly received at its intended destination. Similarly, instead of communicating a desire to receive an acknowledgement, the originating component may send an acknowledgement request in the ACK field (303) that indicates a desire not to receive an acknowledgement. This capability finds application when the communication links of the infrastructure are particularly busy with traffic and ancillary command information, and acknowledgement ICWs would simply add to the communication load.

Figure 5:
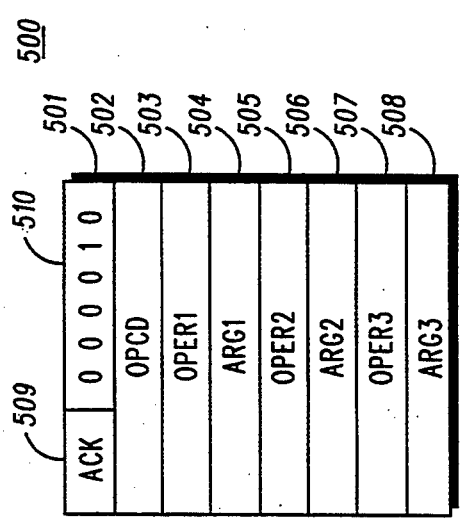
FIG. 5 is yet another specific depiction of an Infrastructure Control Word.

FIGS. 4 and 5 are more specific depictions of Infrastructure Control Words (ICWs) and their associated FIDs. FIG. 4 illustrates the ICW, generally depicted by the numeral 400, for a FID value of 00001 binary (410). This FID provides for a single opcode (402) and two operands (403 and 405). The first operand (403) has associated with it a one-byte argument (404). The second operand (405) has associated with it a 3-byte argument (406, 407, and 408). This ICW format is useful when a single high-level function must be modified by two parameters, one of which is small numerically, the other of which may be large numerically. A specific application of this ICW format in RF communication systems is for synchronized transmission of a single message through multiple base station transmitters. The OPCD (opcode) value (402) would be TRANSMIT and the OPER1 (first operand) value (403) would be MODULATION. ARG1 (the first argument) (404) would be the modulation type, OPER2, the second operand value (405) would be TIME, and the second argument (ARG2) (406–408) would be the specific transmission time. The large argument for the second operand is needed to provide sufficient resolution for the transmit time.

FIG. 5 illustrates the ICW, generally depicted by the numeral 500, for a FID (510) of 00010 binary. This FID provides for a single opcode (502) and three operands (503, 505, and 507). All three operands (503, 505, and 507) have associated with them a one-byte argument (504, 506, and 508). This ICW format is useful when a single high-level function must be modified by three different parameters, all of which are similar in size. A specific application of this ICW format in RF communication systems is for configuration control of a base station transmitter. Several parameters such as RF channel number, system access code, and transmit power level could all be controlled with a single ICW.

Figure 6:
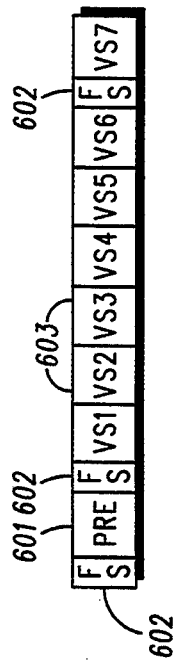
FIG. 6 is a representation of the way in which digital message streams are received over the air.

FIG. 6 is a representation of the way in which digital message streams are received over the air in an RF communication system. The figure specifically illustrates a over-the-air digital voice message, generally depicted by the numeral 600, that is a continuous stream of information. Frame synchronization (FS)information (602) is transmitted at the beginning of the message (600) and periodically throughout. An over-the-air preamble (601) is sent as the first user information in the message (600) to provide appropriate high level synchronization and control functions. Voice information is sent in voice segments (VS) (603), each representing a time segment of voice according to the voice coding algorithm in use. Of course, many voice coding techniques, well-known in the art, are suitable for this application.

Figure 7:
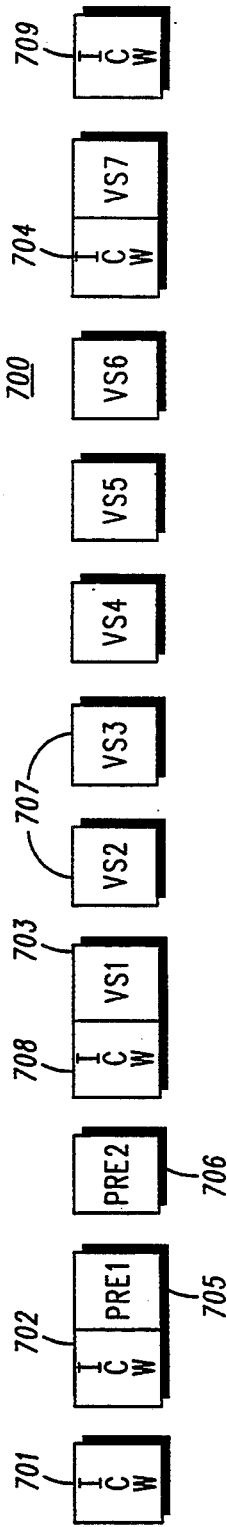
FIG. 7 shows a protocol used to transfer control and voice information among various components of a communication system.

FIG. 7 illustrates the protocol used to transfer control and voice information among the various components of the communication system infrastructure shown in FIG. 2. When synchronization information (602 in FIG. 6) is detected, a start-of-message control indication (701 in FIG. 7) is sent from the base station (201) to the DIU (202). When the first half of the over-the-air preamble (601) has been received, the first portion of an infrastructure communication preamble (705), along with a receive control indication (702) is sent from the base station (201) to the DIU (202). When the second half of the over-the-air preamble (601) has been received, the second portion of the infrastructure communication preamble (706) is sent from the base station (201) to the DIU (202). When the next frame synchronization indication (602) and first voice segment (603) are received, the voice segment (703), along with receive control information (708), are sent from the base station (201) to the DIU (202). When the remaining five voice segments (603) in the first voice frame are received, each individual voice segment (707) is sent from the base station (201) to the DIU (202). In this manner, each voice segment immediately following a frame synchronization indication is sent along with receive control information from the base station (201) to the DIU (202). The intervening voice segments are each sent by themselves from the base station (201) to the DIU (202). This process continues until the message terminates. At that time, an end of received message control indication (709) is sent from the base station (201) to the DIU (202).

Figure 8:
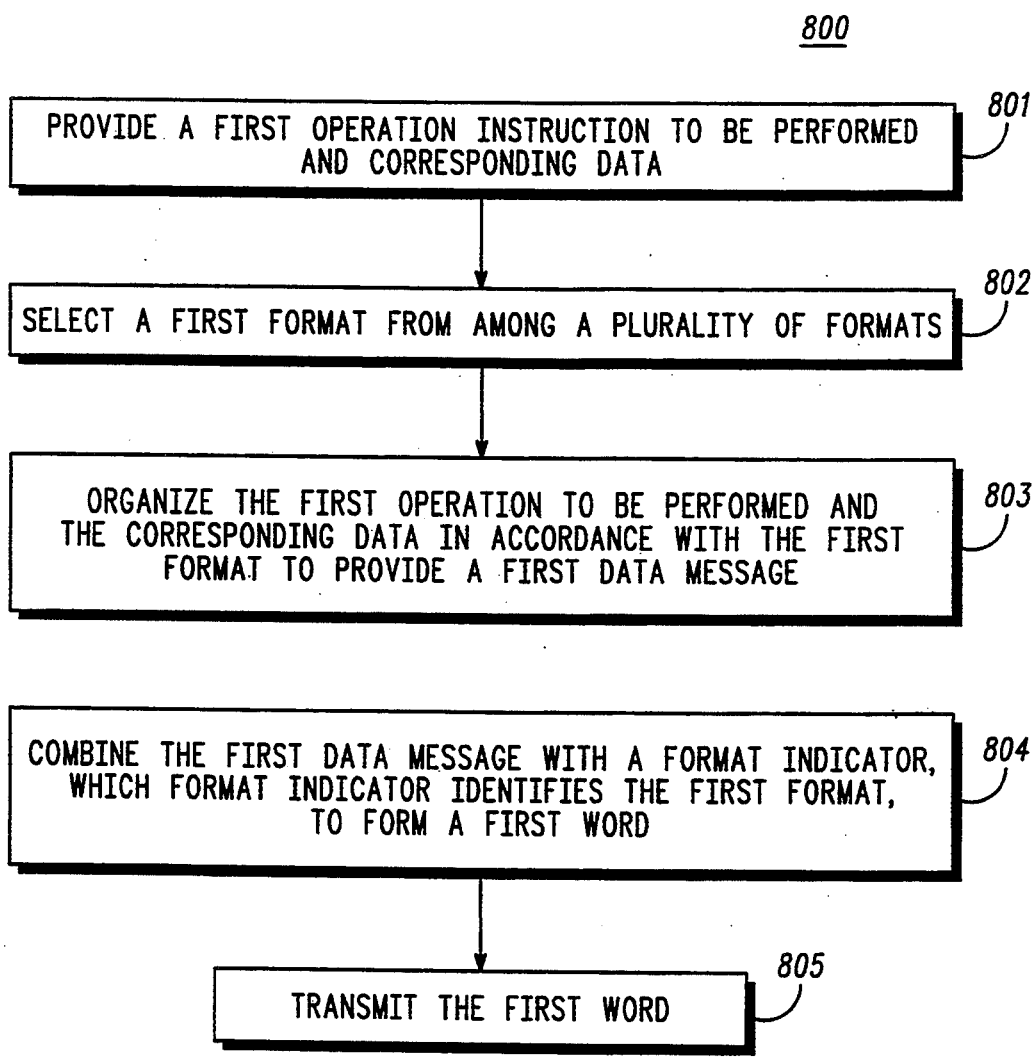
FIG. 8 is flow chart of a series of method steps in accordance with the present invention.

FIG. 8 is a flowchart of a method in accordance with the present invention, as generally depicted by the numeral 800. As discussed previously, communicating control information from one component of a communication system infrastructure to another component involves the transmission of proper opcodes, operands, and arguments to effect the desired result. As illustrated in block 801, the first step is to provide a first operation instruction to be performed along with corresponding data. The operation instruction includes at least an opcode and operand, and, depending upon the specific operation, may include an argument of variable length. The amount of this corresponding data dictates the specific format in which the operation instruction will be transmitted, thus the next step (802) is selecting a first format from among a plurality of formats.

The format selected, in turn, dictates the specific ordering of opcodes, operands, and arguments, thus, in block 803, the first operation to be performed and the corresponding data is organized in accordance with the first format to provide a first data message. In the next operation (804), the first data message is combined with a format indicator, which format indicator (or FID) identifies the first format, to form a first word. In block 805, the first word is transmitted.

Of course, the method described above can be extended to apply to even longer messages that may require a first operation instruction and a second operation instruction. In that event, after transmitting the first word, and second operation instruction to be performed is provided, along with corresponding data. A second format is selected from among the plurality of formats, and the second operation instruction to be performed, along with the corresponding data, is organized in accordance with the second format to provide a second data message. The second data message is combined with a format indicator that identifies the second format to form a second word, and the second word is transmitted.

The protocol described in the foregoing paragraphs provides a method for communicating a wide range of control information among the components of a communication system. This data communication protocol may be employed without the use of additional electronic components, such as filters or relays, and it permits control information to be interleaved with system traffic, thus providing cost-effective and efficient transmission of control and ancillary messages.

What is claimed is:

1. In a radio communication system comprising a plurality of fixed devices, one of said plurality of fixed devices comprising an initiating device and another of said plurality of fixed devices comprising a receiving device, a method for transferring control information from the initiating device to the receiving device, the method comprising the steps of:
at the initiating device;
   (a) providing a first operation instruction to be performed and corresponding data;
   (b) selecting a first format from among a plurality of formats;
   (c) organizing the first operation instruction to be performed and the corresponding data in accordance with the first format to provide a first data message;
   (d) combining the first data message with a format indicator, where the format indicator identifies the first format to form a first word, the first word comprising at least one opcode, at least one operand, and at least one argument, wherein the opcode, the operand, and the argument are hierarchically related, with the opcode indicating a high level function, the operand providing a modifier for the opcode, and the argument providing a specific value for the operand;
   (e) transmitting the first word to the receiving device.

2. The method in accordance with claim 1, wherein the selecting step (b) includes the step of selecting the first format based on how much of the corresponding data exists.

3. In a radio communication system comprising a plurality of fixed devices, one of said plurality of fixed devices comprising an initiating device and another of said plurality of fixed devices comprising a receiving device, a method for transferring control information from the initiating device to the receiving device, the method comprising the steps of:
at the initiating device;
   (a) providing a first operation instruction to be performed and corresponding data;
   (b) selecting a first format from among a plurality of formats;
   (c) organizing the first operation instruction to be performed and the corresponding data in accordance with the first format to provide a first data message;
   (d) combining the first data message with a format indicator, where the format indicator identifies the first format to form a first word, the first word comprising at least one opcode, at least one operand, and at least one argument, wherein the opcode, the operand, and the argument are hierarchically related, with the opcode indicating a high level function, the operand providing a modifier for the opcode, and the argument providing a specific value for the operand;
   (e) transmitting the first word to the receiving device;
   (f) providing a second operation instruction to be performed and corresponding data;
   (g) selecting a second format from among the plurality of formats;
   (h) organizing the second operation instruction to be performed and the corresponding data in accordance with the second format to provide a second data message;
   (i) combining the second data message with a second format indicator, where the second format indicator identifies the second format to form a second word, the second word comprising at least one opcode, at least one operand, and at least one argument, wherein the opcode, the operand, and the argument are hierarchically related, with the opcode indicating a high level function, the operand providing a modifier for the opcode, and the argument providing a specific value for the operand;
   (j) transmitting the second word to the receiving device.

4. In a radio communication system comprising a plurality of fixed devices, one of said plurality of fixed devices comprising an initiating device and another of said plurality of fixed devices comprising a receiving device, the initiating device coupled to the receiving device by means of a communication link having data packets being transported thereon, the data packets including voice information, a method for transferring control information from the initiating device to the receiving device, the method comprising the steps of:
at the initiating device;
   (a) providing a first operation instruction to be performed and corresponding data;
   (b) selecting a first format from among a plurality of formats;
   (c) organizing the first operation instruction to be performed and the corresponding data in accordance with the first format to provide a first data message;
   (d) combining the first data message with a format indicator, where the format indicator identifies the first format to form a first word, the first word comprising at least one opcode, at least one operand, and at least one argument, wherein the opcode, the operand, and the argument are hierarchically related, with the opcode indicating a high level function, the operand providing a modifier for the opcode, and the argument providing a specific value for the operand;
   (e) transmitting the first word over the communication link to the receiving device.

5. The method in accordance with claim 4, wherein the transmitting step (e) includes the steps of:
   (e1) providing a communication link access protocol;
   (e2) using the communication link access protocol to interleave the first word with other data packets that are being transported over the communication link.

* * * * *